United States Patent [19]

Itabashi et al.

[11] Patent Number: 5,407,259
[45] Date of Patent: Apr. 18, 1995

[54] VEHICLE YAW REDUCTION BASED UPON RIGHT AND LEFT VEHICLE WHEEL ACCELERATION DIFFERENCES AND USE OF BRAKE CONTROL

[75] Inventors: Satoshi Itabashi; Akihiko Takahashi, both of Anjo; Yasunori Sakata, Toyota; Hiroyuki Nagai, Nagoya, all of Japan

[73] Assignee: Aisin Seiki Kabushiki Kaisha, Kariya, Japan

[21] Appl. No.: 36,266

[22] Filed: Mar. 24, 1993

[30] Foreign Application Priority Data

Mar. 27, 1992 [JP] Japan ................................. 4-071543

[51] Int. Cl.$^6$ ............................................. B60T 8/00
[52] U.S. Cl. ..................................... 303/111; 303/110
[58] Field of Search ................ 303/9.71, 93, 100, 103, 303/110, 116.1, 119.1, DIG. 1-4, 111; 364/426.02; 180/197

[56] References Cited

U.S. PATENT DOCUMENTS

| | | | |
|---|---|---|---|
| 5,058,018 | 10/1991 | Kuwana et al. | 303/111 X |
| 5,063,514 | 11/1991 | Headley et al. | 303/111 X |
| 5,089,967 | 2/1992 | Haseda et al. | 303/93 X |
| 5,229,944 | 7/1993 | Yasuno | 303/100 X |

FOREIGN PATENT DOCUMENTS 3-96465  4/1991  Japan .

Primary Examiner—Josie A. Ballato
Attorney, Agent, or Firm—Burns, Doane, Swecker & Mathis

[57] ABSTRACT

The yaw moment reducing device comprises wheel speed sensors for detecting the speeds of the right and left wheels, an acceleration calculation device for calculating accelerations of the right and left wheels based on the speed of the right and left wheels, a substraction device for subtracting the difference in accelerations between the right and left wheels, a braking control device for controlling the braking force based on the difference of the accelerations, and a brake pressure modulating device for modulating the brake pressure which is supplied to each wheel. The wheel speeds of each wheel are detected by the wheel speed sensors. The acceleration calculation device calculates the accelerations of each wheel while the substraction device provides the difference in accelerations between the right and left wheels. The yaw moment is in response to the difference of the acceleration between the right and left wheels. In other words, the yaw moment can be presumed by the difference of the acceleration between the right and left wheels. The brake pressure modulating device modulates the brake pressure which is supplied to each wheel based on the calculation result of the braking control devices. Thus, the yaw moment can be controlled.

7 Claims, 9 Drawing Sheets

VEHICLE YAW REDUCTION BASED UPON RIGHT AND LEFT VEHICLE WHEEL ACCELERATION DIFFERENCES AND USE OF BRAKE CONTROL

FIELD OF THE INVENTION

This invention relates to a device for reducing the yaw moment generated by a difference in frictional coefficient between the right and left wheels on the road surface.

BACKGROUND OF THE INVENTION

When an automobile brakes on a split road (i.e., a road having different frictional characteristics) a frictional coefficient between the road and the right wheel may be different from the frictional coefficient between the road and the left wheel. As a result, a yaw moment may be generated on the automobile based on the difference in braking forces between the left and right wheels. Under some bad conditions, the automobile will turn suddenly due to the generated yaw moment.

To reduce such yaw moment, Japanese Laid-open Patent Publication No. H03-96465 discloses a "low select" control which reduces the brake pressure for one of the front wheels which has a higher frictional coefficient based on a brake pressure for the other front wheel which has lower frictional coefficient. The "low select" control is performed for a predetermined time period Tk at the time of anti-locking brake control. The "low select" control ends after the time period Tk has elapsed. At that moment, if a speed of the wheel which has a lower frictional coefficient is below a predetermined value, the control judges that the automobile is travelling on the split road. Upon determining that the automobile is travelling on such a road, the control increases the pressure for the wheel which has the higher frictional coefficient.

However, if the time period Tk is short, the yaw moment cannot be reduced sufficiently and thus, the automobile may experience sudden large turning movements. On the other hand, if the time period Tk is long, the automobile cannot be braked sufficiently so that more distance is required to stop the automobile. Thus, the time period Tk has to be properly determined. However, the proper value of the time period Tk may vary depending upon the road conditions and/or the depressing force applied to the brake pedal. Therefore, optimum control cannot be performed if the time period Tk is a fixed value.

Additionally, the brake pressure is increased as soon as the time period Tk is elapsed. Therefore, the yaw rate may be increased once again after the time period Tk has elapsed.

SUMMARY OF THE INVENTION

Accordingly, one of the objects of this invention is to solve the above conventional drawbacks.

Another object of this invention is to control the yaw moment by presuming the generated yaw rate.

To achieve at least the above objects, the yaw moment reducing device comprises wheel speed sensors for detecting the speeds of the right and left wheels, acceleration calculation means for calculating the accelerations of the right and left wheels based on the speed of the right and left wheels, substraction means for subtracting the difference in accelerations between the right and left wheels, braking control means for controlling the braking force based on the difference in accelerations, and brake pressure modulating means for modulating the brake pressure which is supplied to each wheel.

The wheel speed of each wheel is detected by the wheel speed sensors while the acceleration calculation means calculates the acceleration of each wheel. The substraction means provides the difference in acceleration between the right and left wheels. Formulas 1 and 2 set forth below show the wheel acceleration DVw(H) for one of the wheels which has a higher frictional coefficient and the wheel acceleration DVw(L) for the other wheel which has a lower frictional coefficient.

$$DVw(H) \propto \mu(H) \cdot W(H) \cdot R(H) - Tb(H) \propto M(H) \qquad \text{Formula 1}$$

$$DVw(L) \propto \mu(L) \cdot W(L) \cdot R(L) - Tb(L) \propto M(L) \qquad \text{Formula 2}$$

where:
$\mu$ is frictional coefficient on road surface.
W is load of the wheel.
R is a diameter of the wheel.
Tb is braking torque.
M is moment.
(H) means a wheel which has a higher frictional coefficient.
(L) means a wheel which has a lower frictional coefficient.

Formula 3 set forth below is based on the above-described Formulas 1 and 2.

$$DVw(H) - DVw(L) \propto M(H) - M(L) \qquad \text{Formula 3}$$

Since "M(H)-M(L)" refers to the respective yaw moments, the yaw moments are expressed in terms of the difference in acceleration between the right and left wheels. In other words, the yaw moment can be presumed from the difference in acceleration between the right and left wheels. The brake pressure modulating means modulates the brake pressure which is supplied to each wheel based on the calculation result of the braking control means. Thus, the yaw moment can be controlled.

BRIEF EXPLANATION OF THE DRAWING FIGURES

DESCRIPTION OF THE PREFERRED EMBODIMENTS

Figure 1:
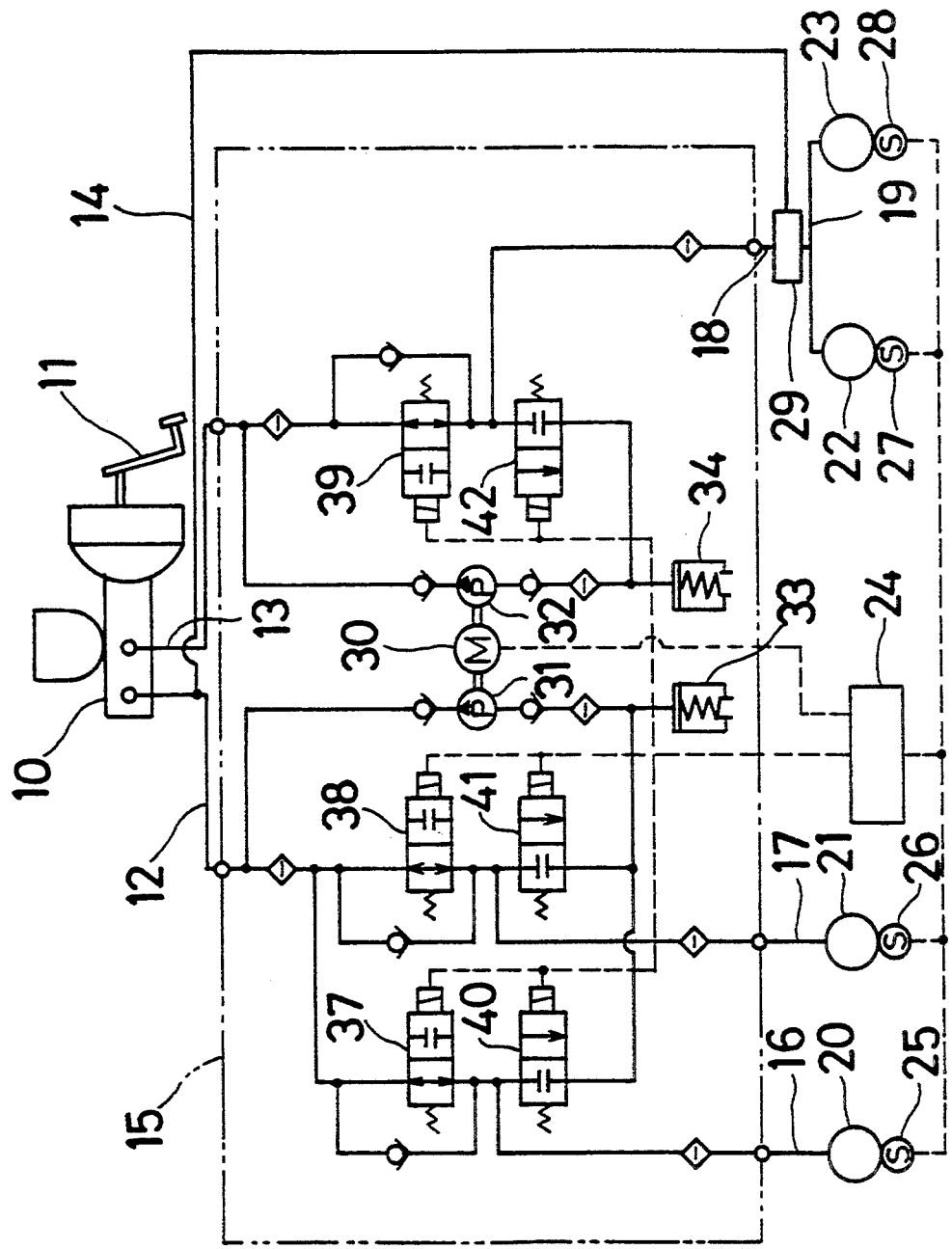
FIG. 1 is a block diagram showing hydraulic circuits associated with the system of the present invention.

FIG. 1 shows hydraulic circuits of a brake system for a rear wheel drive vehicle or a four wheel drive vehicle. The hydraulic circuits are the brake pressure modulating means for modulating the brake pressure which is supplied to each wheel. A brake master cylinder 10 generates fluid pressure in the conduits 12 and 13 in response to the depression force of a brake pedal 11. The conduits 12 and 13 are connected to the fluid pressure control device 15. The fluid pressure control device 15 increases, decreases or maintains the fluid pressure in the conduits 12 and 13 in order to generate modulated pressure in the conduits 16, 17 and 18.

The conduit 16 is connected to a wheel cylinder 20 which is located at a front left wheel. The conduit 17 is connected to a wheel cylinder 21 which is located at a front right wheel. The conduit 18 is connected to the conduit 19 through the load sensing pressure valve 29. The conduit 19 is connected to wheel cylinders 22 and 23 which are located at the right and left rear wheels respectively. The load sensing pressure valve 29 is also connected to a conduit 14 which branches from the conduit 12. When the pressure for the front wheels exceeds a predetermined pressure in the conduit 14, the load sensing pressure valve 29 transmits the pressure from the conduit 18 to the conduit 19.

The fluid pressure control device 15 further includes a motor 30, a solenoid valve 37 for increasing pressure to the front left wheel, a solenoid valve 40 for decreasing pressure from the front left wheel, a solenoid valve 38 for increasing pressure to the front right wheel, a solenoid valve 41 for decreasing pressure from the front right wheel, a solenoid valve 39 for increasing pressure to the rear wheels and a solenoid valve 42 for decreasing pressure from the rear wheels. The motor 30 drives several pumps 31 and 32 in order to generate pressure. The pump 31 circulates brake fluid for the front wheels from reservoir 33 to the conduit 12.

The solenoid valve 37 is a normally open electromagnetic valve. The solenoid valve 37 connects the conduit 12 to the conduit 16 in its open state and cuts off the conduit 12 from the conduit 16 in its closed state. The solenoid valve 40 is a normally closed electromagnetic valve. The solenoid valve 40 connects the conduit 16 to the reservoir 33 in its open state and cuts off the conduit 16 from the reservoir 33 in its closed state. Accordingly, the pressure which is generated in the master cylinder 10 is directly transmitted to the wheel cylinder 20 at the normal state of the front left wheel. When the valve solenoid 37 is closed, the pressure is maintained in the wheel cylinder 20. When the solenoid 37 is closed and the solenoid 40 is opened, the pressure is vented from the wheel cylinder 20 to the reservoir 33 so that the pressure is decreased in the wheel cylinder 20. Regarding the front right wheel and the rear wheels, the construction and operation are the same as the front left wheel. Therefore, a detailed description will not be set forth.

As can be easily understood from FIG. 1, the wheel cylinder 22 for the rear left wheel is connected to the wheel cylinder 23 for the rear right wheel so that the pressure is controlled at the same time between these wheel cylinders 22 and 23.

Figure 2:
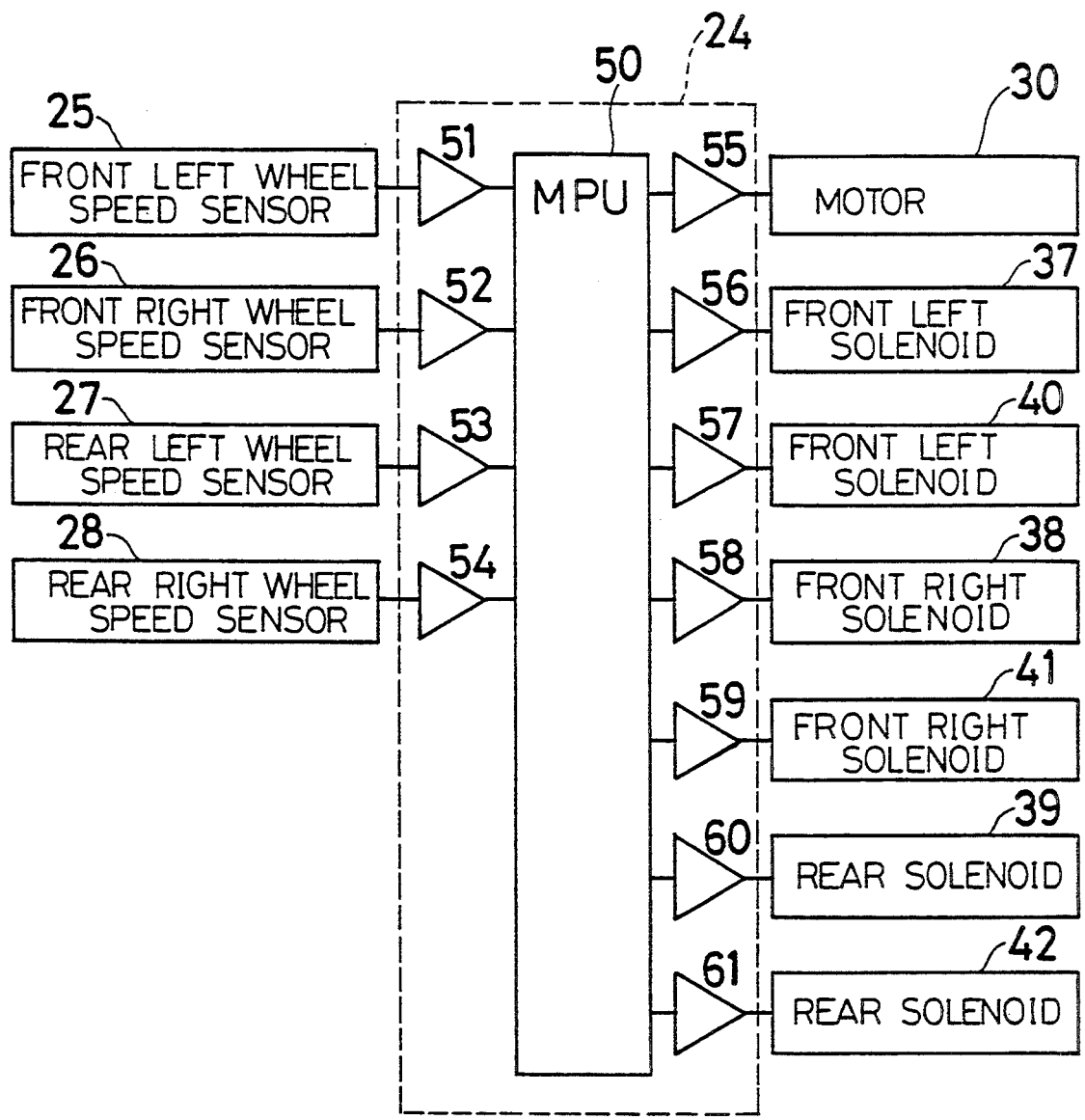
FIG. 2 is a block diagram showing an electric circuit associated with the system of the present invention.
Figure 3:
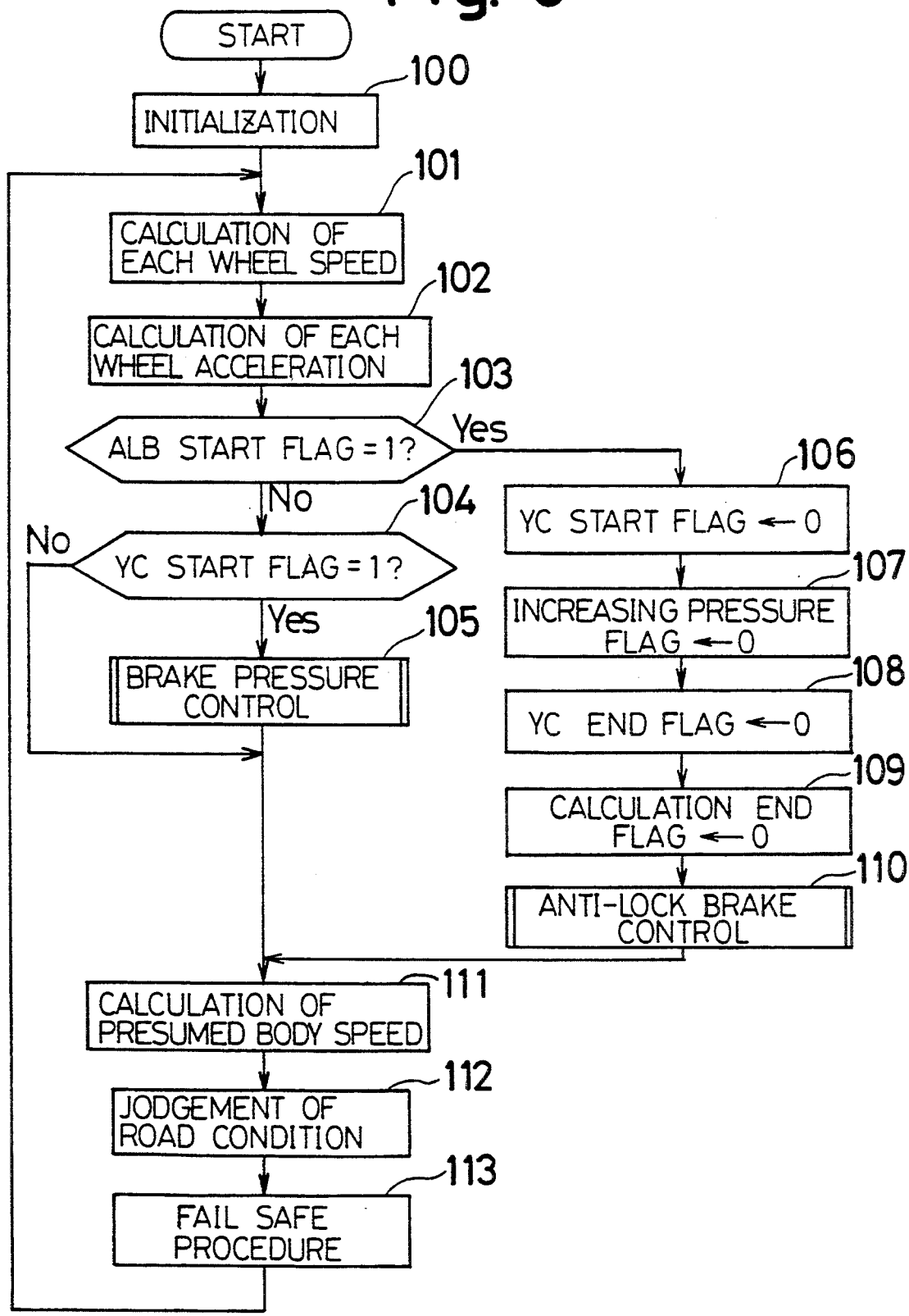
FIG. 3 is a flow chart showing a main-routine for the embodiment of FIG. 1.

Each wheel has associated therewith a speed sensor 25, 26, 27 and 28 which detects each wheel speed. As shown in the FIG. 2, each speed sensor 25, 26, 27 and 28 is connected to an electronic control unit 24 in order to send speed signals from each speed sensor 25, 26, 27 and 28 to the electronic control unit 24.

The solenoid valves, 37, 40, 38, 41, 39 and 42 are connected to the electronic control unit 24 in order to open or close each respective solenoid valve. The motor 30 is also connected to the electronic control unit 24 in order to rotate or stop the pumps 31 and 32. The electronic control unit 24 includes input interface circuits 51, 52, 53 and 54 for each of the speed sensors 25, 26, 27 and 28. Further, the electronic control unit 24 includes output interface circuits 55, 56, 57, 58, 59, 60 and 61 for the motor 30 and for each of the solenoid valves 37, 40, 38, 41, 39 and 42. Each input and output interface circuit 51, 52, 53, 54, 55, 56, 57, 58, 59, 60 and 61 is connected to the micro-processing unit 50.

The micro-processing unit 50 executes yaw control for reducing the yaw moment, increasing pressure control for the end of the yaw control, and anti-locking control for preventing the wheels from slipping. Referring now to FIGS. 3 to 7, the operation of the micro-processing unit 50 will be explained.

Upon initiation, the micro-processing unit 50 executes the step 100 for initialization. At the step 100, the micro-processing unit 50 initializes the input and output ports, and the memories. In this preferred embodiment, a plurality of flags are used for control. These flags includes ALB start flag for starting anti-locking brake control, YC start flag for starting the yaw control, increasing pressure flag for increasing the brake pressure at the end of the yaw control, YC end flag for ending the yaw control, and calculation end flag for the wheel acceleration DVw. At step 100, all of the flags are set to "0".

At the step 101, the speed Vw of each wheel is calculated. Before calculation, the previous speed Vw' is reserved separately from the present wheel speed Vw. Next, at the step 102, the wheel acceleration DVw is calculated by subtracting the present wheel speed Vw from the previous wheel speed Vw'. Next, at the step 103, the micro-processing unit 50 judges whether the ALB start flag becomes "1" or not. If the ALB start flag is "0", the step 104 is executed in order to judge whether the YC start flag becomes "1" or not. If the YC start flag is "1", the brake pressure control sub-routine is executed for yawing control. If the ALB start flag is "1" at the step 103, the steps 106 to 109 are executed in order to set to "0" the YC start flag, the increasing pressure flag, the YC end flag and the calculation end flag. After that, sub-routine for anti-locking control of the brake pressure is executed at the step 110.

At the step 111, a presumed body speed VS0 is calculated from each wheel speed. The step 111 is executed after the YC start flag is "0" at the step 104, after the sub-routine for a brake pressure control is finished at step 105 or after sub-routine for anti-lock control of the brake pressure is finished at step 110.

Next, at the step 112, the frictional coefficient between each wheel and the road surface is presumed from the difference between the presumed body speed VS0 and each wheel speed. Further, the micro-processing unit 50 judges the necessity of anti-locking brake control from the difference between the presumed body speed VS0 and each wheel speed. Then, if necessary, the micro-processing unit 50 sets to "1" the ALB start flag for starting anti-locking brake control. Furthermore, if necessary, the micro-processing unit 50 sets to "1" the YC start flag for starting the yaw control. After that, the micro-processing unit 50 performs a fail safe procedure at step 113 and returns to step 101.

Figure 4:
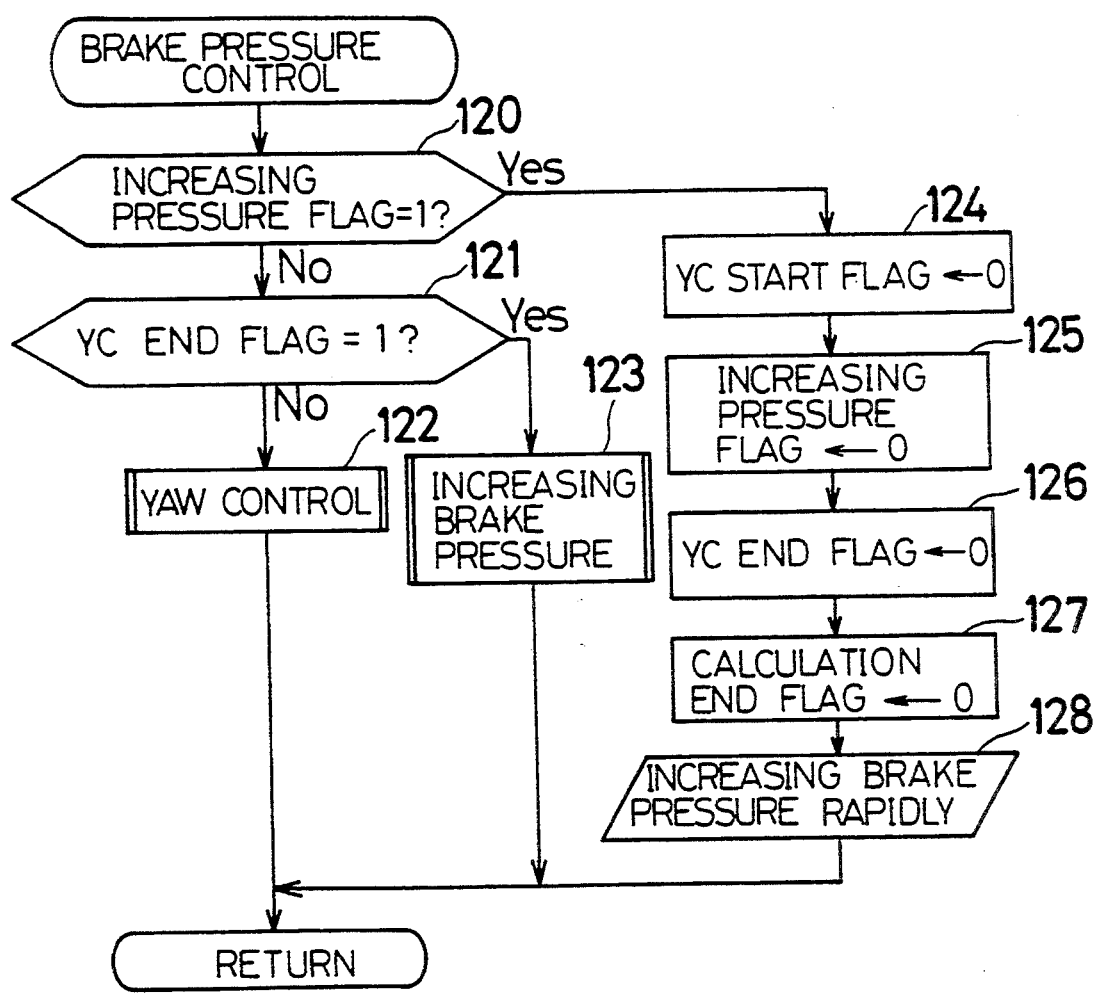
FIG. 4 is a flow chart showing a sub-routine for a brake pressure control.

FIG. 4 is a flow chart showing the sub-routine for a brake pressure control. At the step 120, the micro-processing unit 50 judges whether the increasing pressure flag is "1" or not. If the increasing pressure flag is "0", the next step 12 1 is executed in order to judge whether the YC end flag is "1" or not. If the end flag is "0", the sub-routine for yaw control is executed at step 122. Further, if the YC end flag is "1", the sub-routine is executed at the step 123 for increasing brake pressure at the end of the yaw control.

When the increasing pressure flag is "1" at the step 120, the micro-processing unit 50 executes steps 124 to 127 in order to set to "0" to the YC start flag, the increasing pressure flag, the end flag and the calculation end flag. Then the micro-processing unit 50 executes step 128 in order to increase the brake pressure rapidly for one of the front wheels which has a higher frictional coefficient. The brake pressure is increased rapidly by opening the solenoid valves 37, 38 or 39, and by closing the solenoid valves 40, 41 or 42. Thus, the master cylinder 10 is connected to each wheel cylinder 20, 21, 22 and 23 so that the pressure is increased in each wheel cylinder 20, 21, 22 and 23 in accordance with the depression force applied to the brake pedal 11. After finishing the steps 122, 123 or 128, the main routine is executed.

Figure 5:
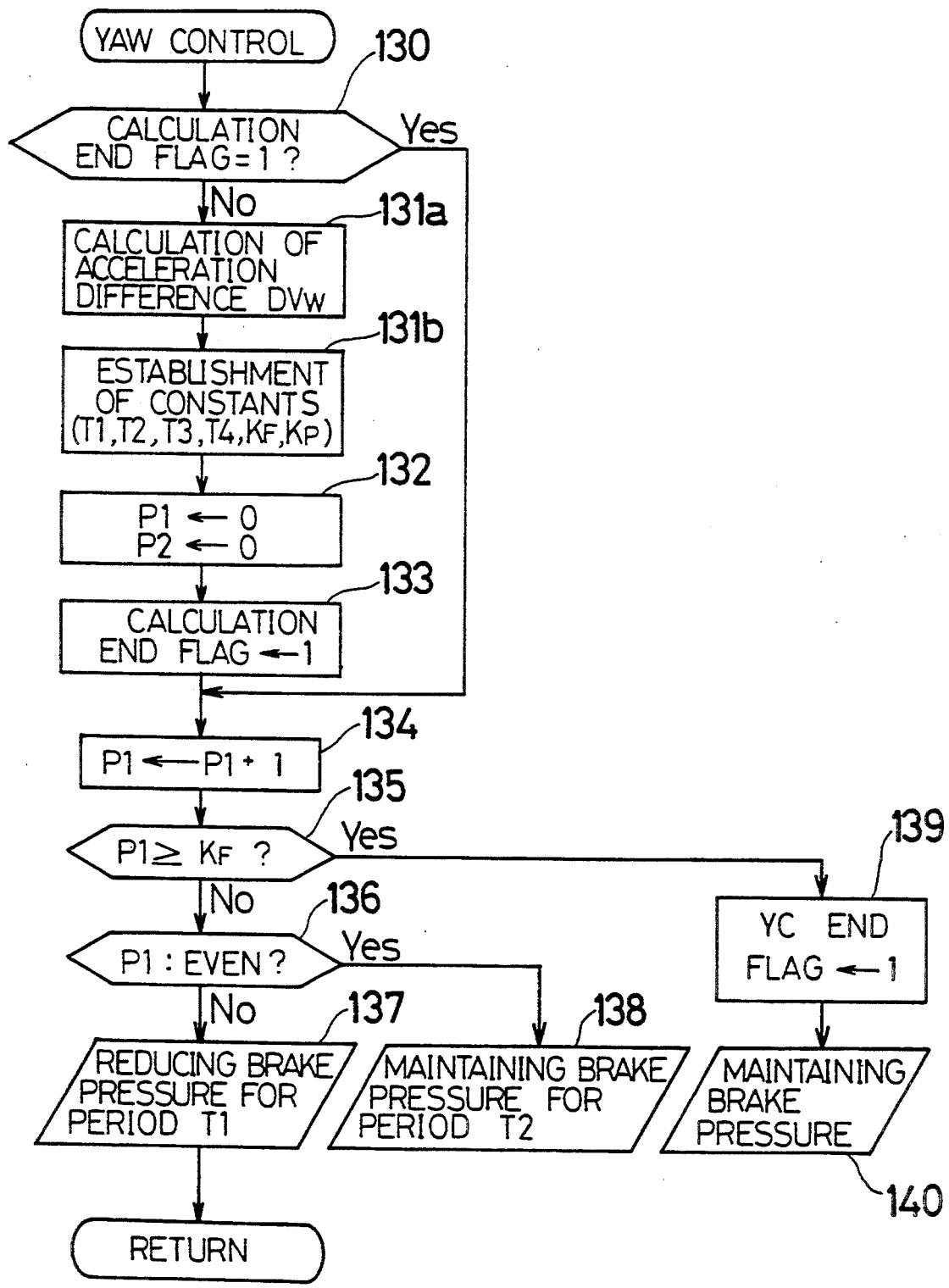
FIG. 5 is a flow chart showing a sub-routine for yaw control.

FIG. 5 is a flow chart showing the sub-routine for yaw control. At the step 130, the micro-processing unit 50 judges whether the calculation end flag is "1" or not. If the calculation end flag is "0", initialization is performed for initiating the yaw control at the steps 131a, 131b, 132 and 133. At the step 131a, the micro-processing unit 50 calculates acceleration difference DVw between the right and left wheels. At the step 131b, the micro-processing unit 50 establishes proper yaw controlling constants which include time constants T1, T2, T3 and T4, and constants Kr and Kp.

The time constant T1 represents a time for reducing the brake pressure under the sub-routine for the yaw control. The time constant T2 represents a time for maintaining the brake pressure under the sub-routine for the yaw control. The time constant T3 represents a time for maintaining the brake pressure under the sub-routine for increasing brake pressure at the end of the yaw control. The time constant T4 represents a time for increasing the brake pressure under the sub-routine for increasing brake pressure at the end of the yaw control. The constant Kr represents the upper limit of the switching frequency of the brake pressure under the sub-routine for the yaw control. The constant Kp represents the upper limit of the switching frequency of the brake pressure under the sub-routine for increasing brake pressure at the end of the yaw control.

Figure 8:
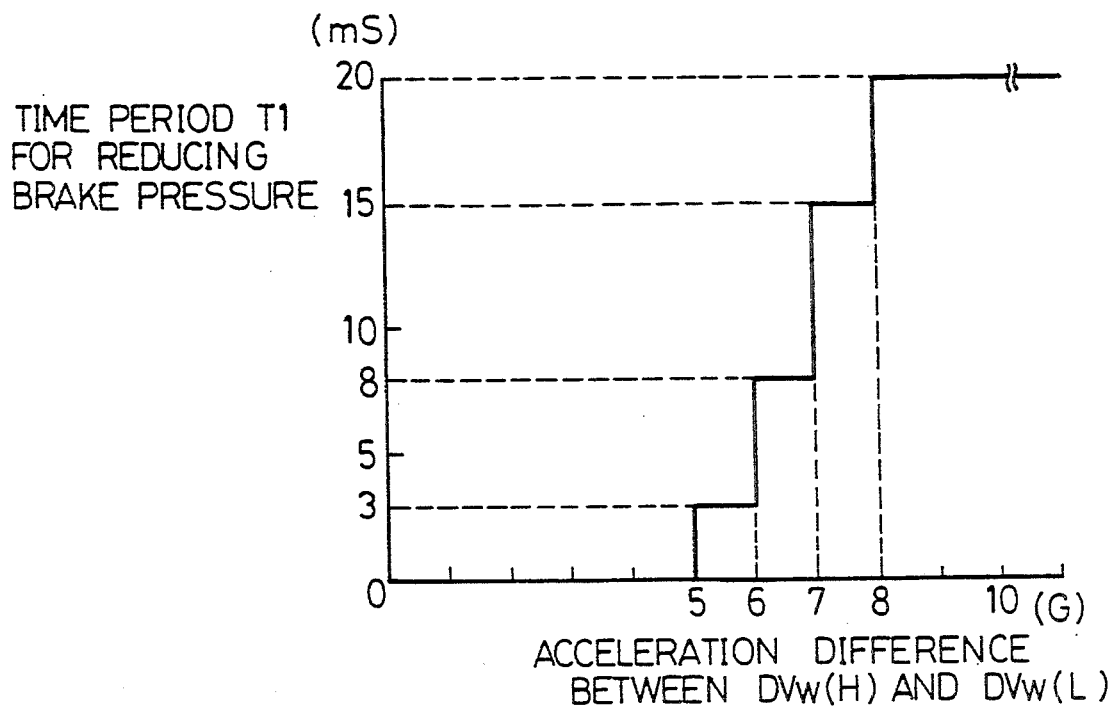
FIG. 8 is a graph showing a manner for determining a time period T1 for decreasing brake pressure.

The value of the time constant T1 is determined based on the acceleration difference DVw between the right and left wheels. FIG. 8 shows an example for setting the time constant T1. The time period of the time constant T1 is increased as the acceleration difference DVw becomes larger.

Figure 9:
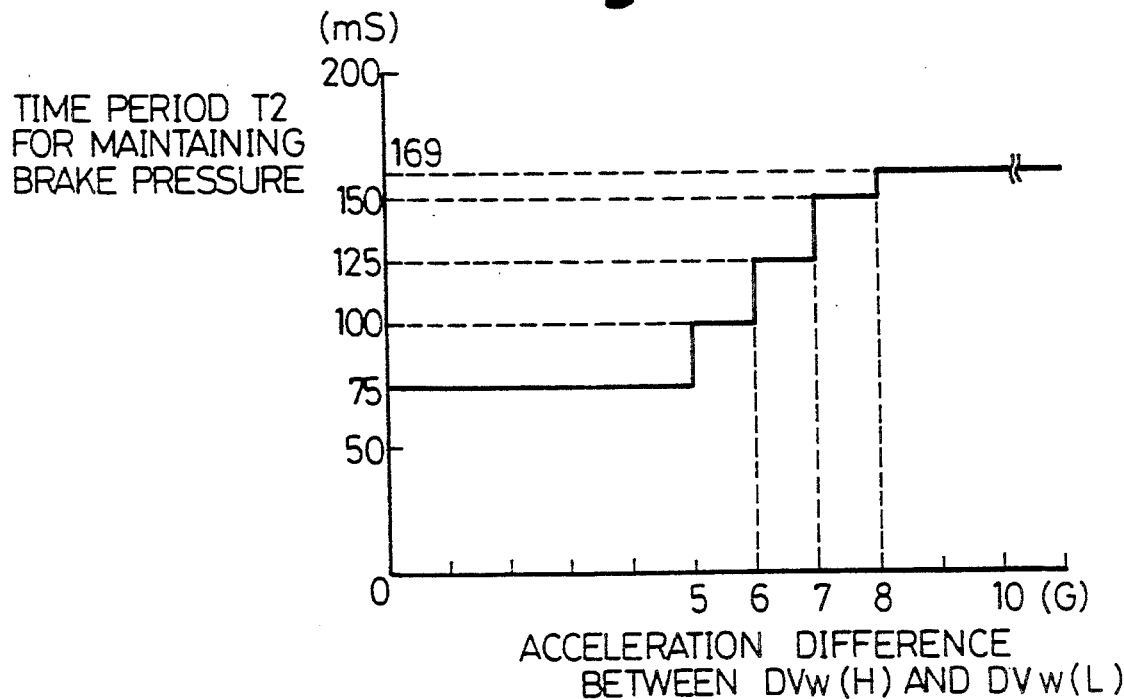
FIG. 9 is a graph showing a manner for determining a time period T2 for maintaining brake pressure.

The value of the time constant T2 is also determined based on the acceleration difference DVw between the right and left wheels. FIG. 9 shows an example for setting the time constant T2. The time period of the time constant T2 is increased as the acceleration difference DVw becomes larger. The time constants T3, T4 and the constants Kr, Kp are set similar to the time constants T1 and T2.

After the aforementioned constants are set, step 132 is executed. At the step 132, counters P1 and P2 are set to "0". Next, at the step 133, the calculation end flag is set to "1". After that, the micro-processing unit 50 executes the step 134. When the calculation end flag is "1" at the step 130, the micro-processing unit 50 skips the initialization of steps 131, 132 and 133 and executes the step 134.

Next, steps 134 to 140 perform the yaw control. At the step 134, the counter P1 is incremented. At the step 135, the micro-processing unit 50 judges whether or not the counter P1 exceeds the constant Kr which is set under initialization. If the counter P1 is below the constant Kr, the micro-processing unit 50 judges whether the counter P1 is even or odd at the step 136. If the counter P1 is odd, the micro-processing unit 50 reduces the brake pressure from the one of the front wheels having a higher frictional coefficient during the time period which is determined by the time T1. If counter P1 is even, the micro-processing unit 50 maintains the brake pressure for the one of the front wheels having a higher frictional coefficient during the time period which is determined by the time T2. After that, the micro-processing unit 50 returns to the subroutine for brake pressure control.

At the step 135, when the counter P1 is greater than or equal to the constant Kr, the micro-processing unit 50 executes the step 139 in order to set the YC end flag to "1". Further, at the step 140, the micro-processing unit 50 maintains the brake pressure for one of the front wheels which has a higher frictional coefficient. After finishing the step 140, the micro-processing unit 50 returns to the sub-routine for brake pressure control. The micro-processing unit 50 reduces the brake pressure by closing the solenoid valves 37, 38 or 39, and by opening the solenoid valves 40, 41 or 42. The wheel cylinders 20, 21, 22 and 23 are cut off from the master cylinder 10 and are connected to the reservoirs 33 and 34. Therefore, the pressure is reduced in the wheel cylinders 20, 21, 22 and 23 so that the braking force is reduced. Further, the micro-processing unit 50 maintains the brake pressure by closing the solenoid valves 37, 38 or 39, and also by closing the solenoid valves 40, 41 or 42. The wheel cylinders 20, 21, 22 and 23 are cut off from the master cylinder 10 and from the reservoirs 33 and 34. Therefore, the pressure is maintained in the wheel cylinders 20, 21, 22 and 23 so that the braking force is maintained.

Figure 6:
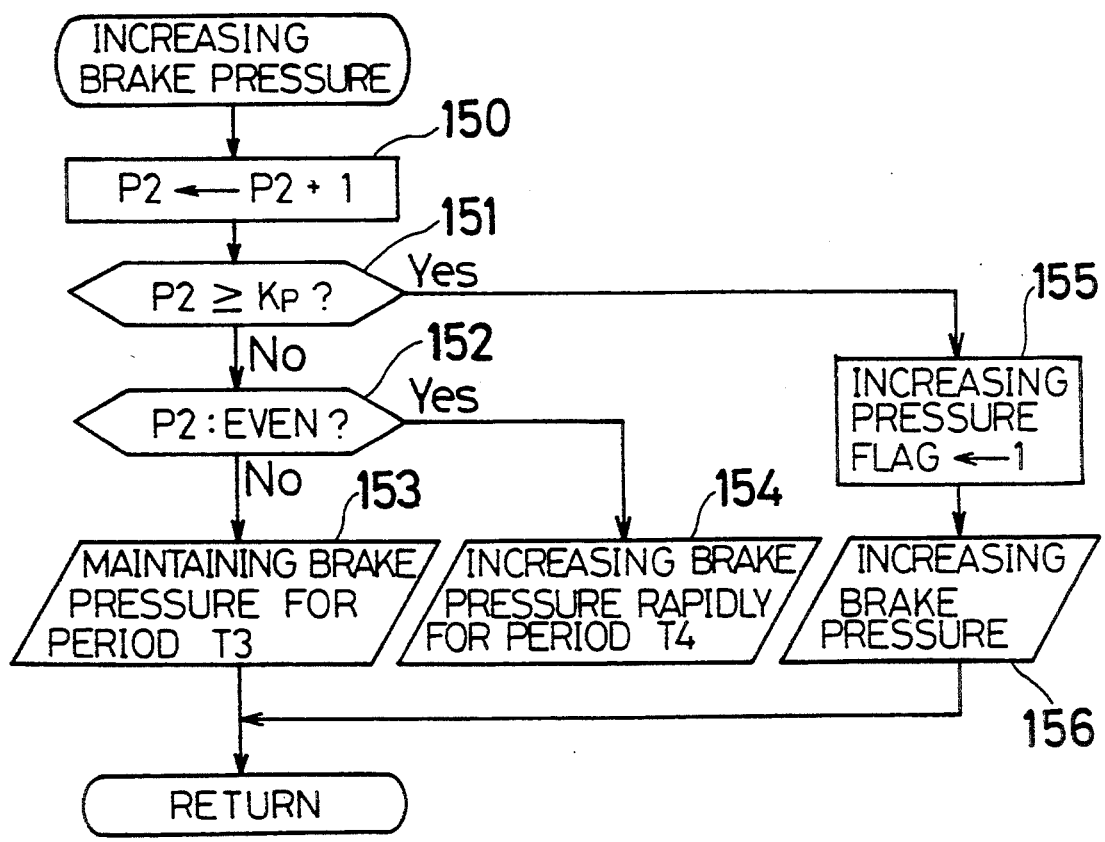
FIG. 6 is a flow chart showing a sub-routine for increasing brake pressure at the end of the yaw control.

FIG. 6 is a flow chart showing the sub-routine for increasing brake pressure at the end of the yaw control. At the step 150, the counter P2 is incremented. At the next step 15 1, the micro-processing unit 50 judges whether the counter P2 exceeds the constant Kp which is set under the initialization. If the counter P2 is below the constant Kp, the micro-processing unit 50 executes the step 152 in order to judge whether the counter P2 is even or odd.

If the counter P2 is odd, the micro-processing unit 50 maintains the brake pressure for the one of the front wheels having a higher frictional coefficient during the time period which is determined by the timer T3. If the counter P2 is even, the micro-processing unit 50 rapidly increases the brake pressure for the one of the front wheels having a higher frictional coefficient during the time period which is determined by the timer T4. After that, the micro-processing unit 50 returns to the sub-routine for brake pressure control.

At the step 151, when the counter P2 becomes greater than or equal to the constant Kp, the micro-processing unit 50 executes the step 155 in order to set the increasing pressure flag to "1". Then, at the step 156, the micro-processing unit 50 rapidly increases the brake pressure for the one of the front wheels having a higher frictional coefficient and then returns to the sub-routine for brake pressure control.

Figure 7:
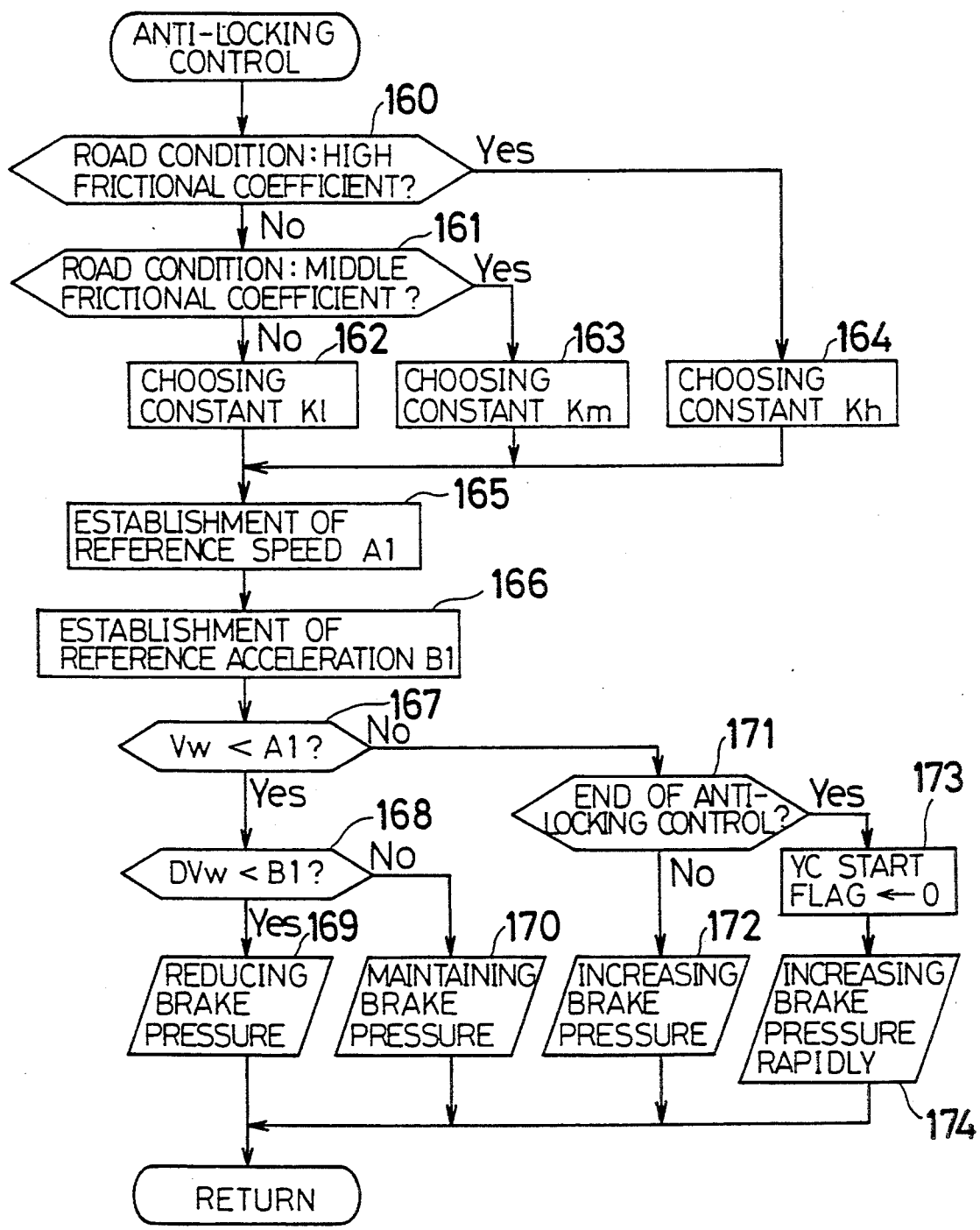
FIG. 7 is a flow chart showing a sub-routine for anti-locking control for the brake pressure.

FIG. 7 is a flow chart showing the sub-routine for anti-locking control of the brake pressure. At the steps 160 and 161, the micro-processing unit 50 judges the frictional coefficient between the road surface and the wheels. If the frictional coefficient is high, the micro-processing unit 50 chooses a constant Kh at the step 164. If the frictional coefficient is in the middle, the micro-processing unit 50 chooses a constant Km at the step 163. If the frictional coefficient is low, the micro-processing unit 50 chooses a constant K1 at the step 162. Next, at the step 165, the micro-processing unit 50 establishes a reference speed A1 based on one of the chosen constants Kh, Km and K1. Further, at the step 166, the micro-processing unit 50 establishes a reference acceleration B1.

Next, at the step 167, the micro-processing unit 50 compares each wheel speed Vw and the reference speed A1. If the wheel speed Vw is below the reference speed A1, the micro-processing unit 50 executes the step 168 in order to compare each wheel acceleration DVw and the reference wheel acceleration B1. If the wheel acceleration DVw is below the reference acceleration B1, the micro-processing unit 50 executes the step 169 in order to reduce the brake pressure. After the acceleration DVw of the wheels becomes greater than or equal to the reference acceleration B1, the micro-processing unit 50 executes the step 170 in order to maintain the brake pressure.

At the step 167, when the wheel speed Vw is greater than or equal to the reference speed A1, the micro-processing unit 50 executes the step 171 in order to judge whether the sub-routine for anti-locking control of the brake pressure can be ended or not. If the sub-routine needs to be further executed, the micro-processing unit 50 executes the step 172 in order to increase the brake pressure. Further, if the sub-routine does not need to be executed, the micro-processing unit 50 executes the steps 173 and 174 in order to increase the brake pressure. At the step 173, the micro-processing unit 50 sets the YC start flag to "0". Then the micro-processing unit 50 executes the step 174 in order to increase the brake pressure rapidly. After that, the micro-processing unit 50 returns to the main routine. The brake pressure is increased by alternately switching between an increasing operation and a maintaining operation. Further, the brake pressure is increased rapidly only by the increasing operation.

Figure 10:
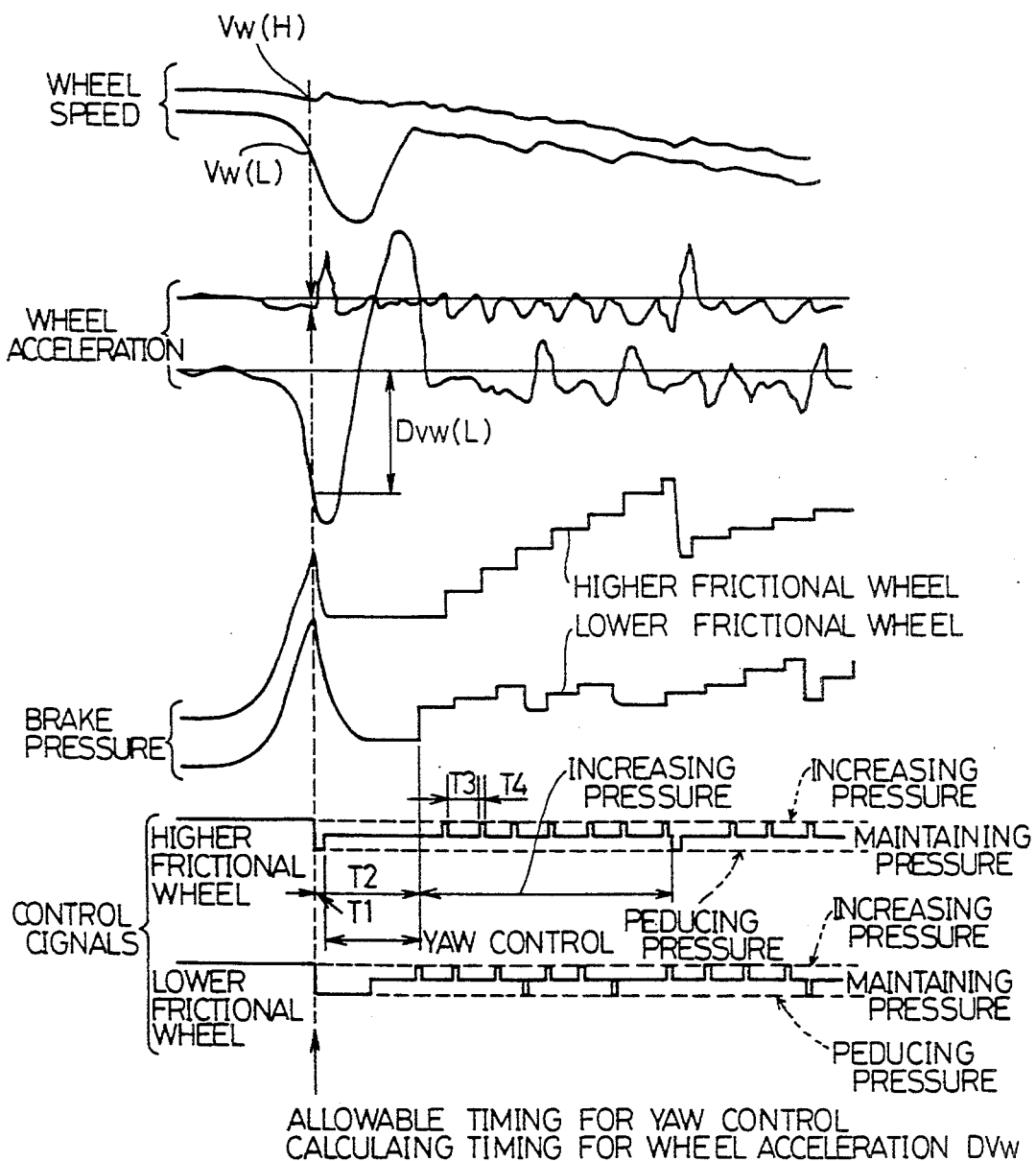
FIG. 10 is a time chart showing an operation of the system illustrated in FIG. 1.

Referring now to FIG. 10, the operation of this embodiment will be explained. On a split road (i.e., a road having different frictional characteristics), the wheel which has a lower frictional coefficient with respect to the road reduces speed more readily as compared to the wheel which has higher frictional coefficient when both of the wheels are braked. During the braking, the micro-processing unit 50 judges whether the yaw moment reduction is required or not. When the micro-processing unit 50 judges that the reduction of the yaw moment is required, the wheel accelerations DVw(H) and DVw(L) are measured. The micro-processing unit 50 determines proper values of the timers T1, T2, T3 and T4 and the constants Kr and Kp based on the difference between the wheel accelerations DVw(H) and DVw(L). In an example shown in FIG. 10, the constant Kr is set to "3" and the constant Kp is set to "15".

The speed of the front wheel which has a lower frictional coefficient may be decreased rapidly so that the anti-lock control will be initiated. Upon initiation of the anti-locking control, the micro-processing unit 50 reduces the brake pressure in order to prevent the wheel from slipping.

After that, the brake pressure is increased, maintained and reduced so that the wheel does not slip. In contrast, at the wheel which has a higher frictional coefficient, the brake pressure is repeatedly increased, maintained and reduced during the yaw control. The reducing period of time is equal to the timer T1 and the maintaining period of time is equal to the timer T2. Thus, the brake pressure for the front wheel which has a higher frictional coefficient is gradually reduced. After this control cycle is repeated Kr times, the micro-processing unit 50 starts the sub-routine for increasing brake pressure at the end of the yaw control. During the subroutine, the brake pressure is repeatedly maintained and increased. The maintaining period of time is equal to the timer T3 and the increasing period of time is equal to the timer T4. Thus, the brake pressure for the front wheel which has higher frictional coefficient is gradually increased. After this control cycle is repeated Kp times, the micro-processing unit 50 increases the brake pressure rapidly. The anti-locking control may be initiated at this time, if the condition for starting the anti-locking control is satisfied at the front wheel which has a higher frictional coefficient. The micro-processing unit 50 changes the reducing time T1, the maintaining times T2 and T3, the increasing time T4 and the repeated times Kr and Kp based on the difference between DVw(H) and DVw(L). The yaw moment can be presumed by the difference between DVw(H) and DVw(L). Accordingly, the deceleration and automobile stability can be controlled by adjusting each constant based on the difference between DVw(H) and DVw(L).

According to this embodiment, the yaw moment is reduced based on the presumed yaw moment. Therefore, unnecessary reduction of the brake pressure can be prevented and the yaw moment can be significantly reduced. Also, the distance needed for stopping the vehicle is minimized. Furthermore, the control can be adopted easily to a variety of frictional coefficients (i.e., road conditions) and/or a variety of manners for depressing the brake pedal (i.e., different applications of force to the brake pedal).

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A yaw moment reducing device, comprising:
   wheel speed sensors for detecting a speed of a right wheel and a left wheel;
   acceleration calculation means for calculating an acceleration of the right wheel and the left wheel based on the speed of the right and left wheels;
   determining means for determining a difference in acceleration between the right and left wheels;
   judging means for judging a split road having different frictional characteristics based on the difference in acceleration between the right and left wheels;
   braking control means for controlling the braking force applied to the right and left wheels, said braking control means including a yaw control means for reducing the yaw rate when the wheels experience the split road; and
   brake pressure modulating means for modulating brake pressure supplied to the right and left wheels.

2. The yaw moment reducing device according to claim 1, wherein said braking control means functions to alternately reduce the brake pressure supplied to the wheels and maintain the brake pressure supplied to the wheels.

3. The yaw moment reducing device according to claim 2, wherein said braking control means alternately reduces and maintains the brake pressure supplied to the wheels for a predetermined time, whereupon after said predetermined time said braking control means alternately maintains and increase the brake pressure supplied to the wheels.

4. The yaw moment reducing device according to claim 1, wherein said braking control means functions to rapidly increase the brake pressure to at least one of the wheels when the speed of said at least one wheel is greater than a reference speed, said reference speed being determined on the basis of the frictional coefficient between the at least one wheel and the road.

5. The yaw moment reducing device according to claim 1, wherein said braking control means functions to reduce the brake pressure to at least one wheel when the wheel speed of the at least one wheel is less than a reference speed and when the acceleration of the at least one wheel is less than a reference acceleration, the reference speed and the reference acceleration being determined on the basis of the frictional coefficient between the at least one wheel and the road.

6. The yaw moment reducing device according to claim 1, wherein said braking control means functions to alternately reduce brake pressure to at least one wheel for a first time period and maintain the brake pressure to the at least one wheel for a second time period, said first and second time periods being determined on the basis of the difference in acceleration between the left and right wheels.

7. A yaw moment reducing device according to claim 1, wherein said braking control means functions to alternately maintain brake pressure to at least one wheel for a first time period and increase brake pressure to the at least one wheel for a second time period, said first and second time periods being determined on the basis of the difference in acceleration between the left and right wheels.

* * * * *